United States Patent [19]
Oliver

[11] 3,794,353
[45] Feb. 26, 1974

[54] FOOT REST FOR ROAD VEHICLE
[76] Inventor: John L. Oliver, 8846 Alondra Blvd., Bellflower, Calif. 90706
[22] Filed: Aug. 18, 1972
[21] Appl. No.: 281,872

[52] U.S. Cl. ............................................. 280/291
[51] Int. Cl. ............................................ B62j 25/00
[58] Field of Search .................... 280/165, 291, 202

[56] References Cited
UNITED STATES PATENTS

| 3,384,389 | 5/1968 | Polley | 280/291 |
| 604,168 | 5/1898 | Divine | 280/291 |
| 1,394,883 | 10/1921 | Bernard | 280/165 |

Primary Examiner—Stanley H. Tollberg
Assistant Examiner—Larry Martin
Attorney, Agent, or Firm—Dominick Nardelli

[57] ABSTRACT

A foot rest for a road vehicle, for example, a motorcycle, is disclosed that is in the form of a square steel bar having the ends twisted 135°. The twisted sections are spaced from their respective ends, leaving a center portion untwisted, as well as the two end portions. To attach the bar to the motorbike, the center portion has formed two axially spaced slots having their openings on opposite sides of the square bar so that U-clamps around the motorcycle frame bars can engage the slots. The end portions each have a bolt hole extending between opposite sides. One bolt hole is disposed 90° to the other, to allow the bar to be formed by twisting it 270° in one operation, so that the bolt holes are aligned and are disposed at 45° to the slots. Pivotable foot pedals are bolted to the bolt holes, and the foot pedals can be pivoted to a vertical position out of the way when not in use.

1 Claim, 4 Drawing Figures

PATENTED FEB 26 1974  3,794,353

FOOT REST FOR ROAD VEHICLE

FIELD OF THE INVENTION

This invention relates to vehicle accessories and more particularly to foot rests with pivotable pedals.

BACKGROUND OF THE INVENTION

When motorcycles are driven for long periods of time, the operator's legs get tired staying in one position, i.e., down below the operator. Therefore, to improve circulation, the operator tries to find a place to raise his feet to a higher position without interfering with the operation of the motorbike. This is difficult because, on standard motorcycles, due to their compactness, there is practically no place that this can be done. Therefore, one would improvise items that can be attached to the cycle to support the legs in a raised position. These items have been mostly all custom made for the different styles of cycles.

OBJECT OF THE INVENTION

An object of this invention is to provide a universal foot rest for a motorcycle, to fit substantially all known motorcycles.

Another object is to provide a foot rest that is economical and attractive and, in addition, is not in the way when operating the motorcycle.

Another object is to provide a foot rest made of a square steel bar stock, having slots formed in the mid-portion, and having the end portions twisted at approximately 135° with respect to the inside or mid-portion.

Another object is to provide a method for making the foot rest of the above objects.

These and other objects and features of advantage will become more apparent after studying the following description and the preferred embodiment of this invention, together with the appended drawings.

DETAILED DESCRIPTION OF THE DRAWINGS

Figure 1:
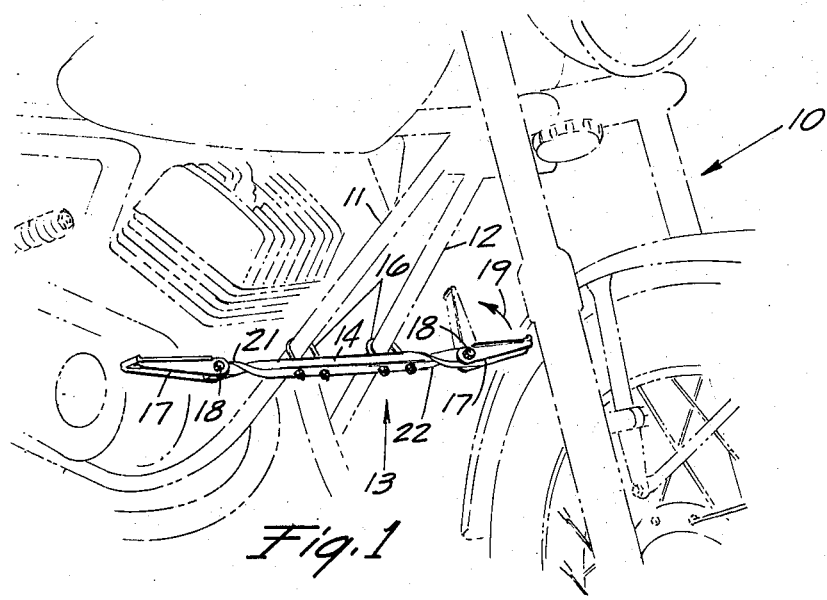
FIG. 1 shows a standard motorcycle, by dashed lines, with the foot rest, in solid lines, attached thereto.

Referring to FIG. 1, a motorcycle 10, of one of the many standard types available, is outlined by dashed lines. The cycle 10 has a frame that includes rearwardly sloping tubular bars 11 and 12. These bars 11 and 12 slope at an angle of substantially 45°. To these tubular bars 11 and 12, my novel foot rest 13 is attached. The foot rest has a bar portion 14 clamped to bars 11 and 12 by suitable U-clamps 16. On the opposite end of the bar portion 14 are pivotably clamped foot pedals 17 by suitable bolts 18. The pedals 17 pivot up, as shown by the arrow 19 and the dash lines. The pedals 17 are prevented from swinging downward past the horizontal in a standard manner not shown. Since the bars 11 and 12 slope at an angle of substantially 45°, near the end of the bar portion 14 are formed twisted portions 21 and 22 to allow the pedals 17 to point substantially upward when in their out of the way position.

Figure 2:
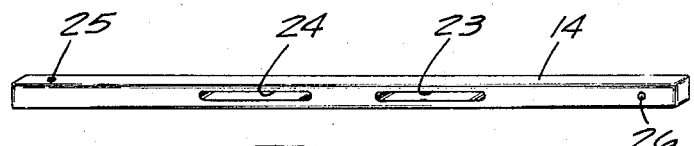
FIG. 2 is a pictorial view of the foot bar portion of the rest of FIG. 1, shown before the twist is formed and without the foot pedals.
Figure 3:
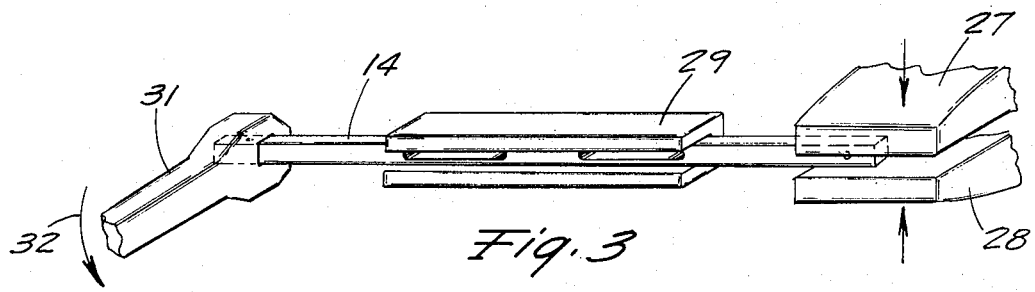
FIG. 3 is a schematic pictorial showing how the twist may be formed in the bar of FIG. 2.

Referring to FIG. 2, the bar portion 14 is shown in greater detail. Near the center of the bar are formed two axially spaced slots 23 and 24. Near the ends are formed two bolt holes 25 and 26 that are disposed 90° to each other so that both twisted portions could be formed in one operation, as shown schematically in FIG. 3. Bar 14 is preferably twisted by clamping one end between jaws 27 and 28 of a vice, not shown. Near the center of the bar 14 is placed a snugly fitted clamp 29 that has a U-cross section, as shown. At the other end is placed a suitable wrench 31 that has a square hole matching the size of the square bar 14. The wrench 31 is twisted in the direction as shown by the arrow 32, through an angle of preferably 270°, thereby each twisted portion 21 and 22 has a twist of 135°.

Figure 4:
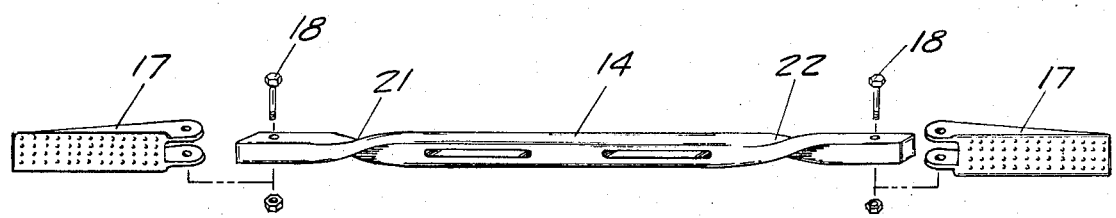
FIG. 4 is an exploded pictorial of the foot rest, including the foot pedals.

FIG. 4 shows pictorially an exploded view of the finished foot rest. Twisted portions 21 and 22 are not shown to be complete 135° twists, but one could readily visualize how they would look. As a simple alternative, each twist could be only 45° and this arrangement would still allow the pedal 17 to be stowed vertically when assembled to the motorcycle 10 as shown. However, the added twist to 135° produces a more pleasing effect. As an alternate method, the bar mid-portion 14 could be clamped at the center and then each end twisted, either 45° or 135°, as required. This requires two twist operations. Since the twisting is preferably done on a lathe instead of by hand, my preferred method is more economical.

After reading the preferred embodiment of my invention, one skilled in the art could devise other embodiments without departing from the spirit of the invention, and therefore my invention includes all embodiments coming within the scope of the claims.

I claim:

1. In combination:

A road vehicle of the two-wheel type disposed one in front of the other;

a frame onto which the rear wheel is attached to rotate about an axis fixed to the frame and the front wheel is mounted with the aid of a fork;

said frame having at least two bars aligned substantially in the same plane which slopes downwardly and rearwardly from the front wheel; and a foot rest comprising:

an elongated square cross-section bar portion having at least two axially spaced slots formed therein, said slots being spaced substantially equally from the respective ends of said elongated bar portion and said slots being disposed to extend from the same side of the square cross-section to the opposite side thereof, a twisted square cross-section bar portion disposed on each end of said elongated bar portion;

a pivotable foot pedal disposed on each of the outer ends of said respective twisted cross-section bar portions so that both pedals can be pivoted from a position axially aligned with said twisted and elongated bar portions to a position that is substantially normal thereto; and at least two U-clamp means disposed around each of said sloping bars and passing through each of said slots to clamp said foot rest to said road vehicle;

said twisted portions having sufficient twist to allow said pedals to extend upward when pivoted normal to said bar portion;
said slots being substantially longer in the axial direction than in the direction transverse thereto, to allow axial movement of the U-clamp means with respect to the bar portion.

* * * * *